United States Patent Office 2,759,028
Patented Aug. 14, 1956

1

2,759,028

PREPARATION OF PRIMARY ALKYLAROMATIC COMPOUNDS

Louis Schmerling, Riverside, Ill., assignor to Universal Oil Products Company, Chicago, Ill., a corporation of Delaware No Drawing. Application December 4, 1953, Serial No. 396,345

14 Claims. (Cl. 260—671)

This invention relates to a process for the preparation of primary alkyl aromatic compounds and more particularly to a process for the preparation of a primary alkylaromatic compound characterized by the presence of a quaternary carbon atom in the alkyl group.

An object of this invention is to prepare primary alkylaromatic compounds containing a quaternary carbon atom in the alkyl group.

A further object of this invention is to prepare primary alkylaromatic compounds containing a quaternary carbon atom in the alkyl group by reacting a saturated 1,1-dihalide with an alkylatable aromatic compound.

A specific object of this invention is to prepare primary alkylaromatic compounds having a quaternary carbon atom in the alkyl group by reacting a 1,1-dihaloalkane containing a quaternary carbon atom with an alkylatable aromatic compound containing a replaceable hydrogen atom in the presence of a condensation catalyst.

One embodiment of this invention relates to the preparation of a primary alkylaromatic hydrocarbon by reacting a saturated 1,1-dihalide containing a quaternary carbon atom with an alkylatable aromatic compound in the presence of an acid-acting catalyst at condensation conditions.

A further embodiment of this invention resides in a process for preparing a primary alkylaromatic hydrocarbon containing a quaternary carbon atom in the alkyl group by reacting a 1,1-dihaloalkane with an alkylatable aromatic hydrocarbon in the presence of an acid-acting catalyst at condensation conditions.

A specific embodiment of this invention resides in a process for preparing a primary alkyl aromatic hydrocarbon containing a quaternary carbon atom in the alkyl group by reacting a 1,1-dichloroalkane containing a quaternary carbon atom with an alkylatable aromatic hydrocarbon containing a replaceable hydrogen atom in the presence of a Friedel-Crafts catalyst at condensation conditions.

A more specific embodiment of this invention is found in a process for preparing alkylaromatic hydrocarbons containing a quaternary carbon atom in the alkyl group by reacting 1,1-dichloro-3,3-dimethylbutane with benzene in the presence of a Friedel-Crafts catalyst at condensation conditions.

A still more specific embodiment of this invention is found in a process for preparing a primary alkylaromatic hydrocarbon containing a quaternary carbon atom in the alkyl group by reacting 1,1-dichloro-3,3-dimethylbutane with benzene in the presence of a Friedel-Crafts type catalyst at condensation conditions.

Still another specific embodiment of this invention is found in a process for preparing a primary alkylaromatic hydrocarbon containing a quaternary atom in the alkyl group by reacting 1,1-dichloro-3,3-dimethylbutane with benzene in the presence of aluminum chloride at a temperature within the range of from about −20° to about +50° C.

Yet another specific embodiment of the invention resides in the process for preparing a primary alkylaromatic compound by reacting a 1,1-dihaloalkane containing a quaternary carbon atom with an alkylatable aromatic hydrocarbon containing a replaceable hydrogen atom in the presence of a saturated hydrocarbon and aluminum chloride at condensation conditions.

Another more specific embodiment of the invention is found in a process for preparing a primary alkylaromatic compound by reacting a 1,1-dihaloalkane containing a quaternary carbon atom with an alkylatable aromatic hydrocarbon containing a replaceable hydrogen atom in the presence of an isoparaffin containing a tertiary carbon atom and aluminum chloride at condensation conditions.

Still another more specific embodiment of the present invention resides in the preparation of a primary alkylaromatic compound by reacting a 1,1-dichloroalkane containing a quaternary carbon atom with an alkylatable aromatic hydrocarbon containing a replaceable hydrogen atom in the presence of an alkylcycloparaffin and aluminum chloride at condensation conditions.

Yet a further specific embodiment of this invention resides in a process for preparing a primary alkylaromatic hydrocarbon containing a quaternary carbon atom which comprises reacting 1,1-dichloro-3,3-dimethylbutane with benzene in the presence of methylcyclopentane and aluminum chloride at a temperature in the range of from about 0° to about +10° C. and recovering the resultant neohexylbenzene.

Other objects and embodiments of this invention referring to alternative dihaloalkanes and containing a quaternary carbon atom and alternative alkylatable aromatic compounds containing a replaceable hydrogen atom will be found in the following further detailed description of the invention.

It has now been discovered that primary alkylbenzenes (i. e., monophenylalkanes) containing a quaternary carbon atom may be prepared by reacting a dihaloalkane containing a quaternary carbon atom with an alkylatable aromatic compound in the presence of a catalyst of the Friedel-Crafts type, particularly aluminum chloride. The expected product from the reaction of a dichloroalkane with benzene in the presence of a Friedel-Crafts catalyst is a diphenylalkane. That the diphenylalkane which would result from the reaction of, for example, 1,1-dichloro-3,3-dimethylbutane with benzene would still contain a quaternary carbon atom is rather unexpected in view of the well-known tendency for such compounds to undergo rearrangement. That a by-product of such a reaction would be a monophenylalkane is also unexpected. That the monophenylalkane would be a primary alkylbenzene containing a quaternary carbon atom is completely unexpected and offers a simple, convenient method for obtaining, for example, 1-phenyl-3,3-dimethylbutane (or, as it has been called, neohexylbenzene), which can otherwise be prepared only by an expensive series of reactions.

The reaction of 1-chloro-3,3-dimethylbutane with benzene in the presence of aluminum chloride may, for example, be illustrated by the following equation:

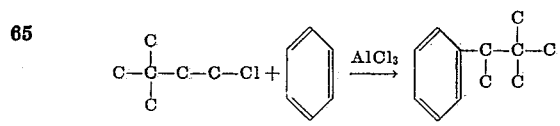

It is to be noted that this hexylbenzene is not a primary alkylbenzene, i. e., 1-phenyl-3,3-dimethylbutane, but rather a secondary hexylbenzene, 2-phenyl-3,3-dimethylbutane.

The reaction of this invention, on the other hand, may be illustrated as follows:

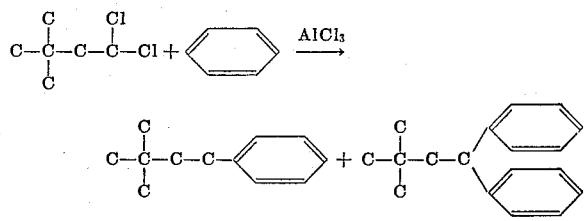

It is to be noted that the monohexylbenzene is the otherwise difficultly obtainable primary hexylbenzene, 1-phenyl-3,3-dimethylbutane or neohexylbenzene.

The primary alkylbenzenes of the present invention may be used as such or as intermediate in the preparation of detergents, pharmaceuticals, resins, fine chemicals, etc.

Alkylating agents which may be used within the scope of this invention are saturated 1,1-dihalides such as 1,1-dihalo-$\chi,\chi$-dialkylalkanes, the preferred halogens being chlorine and bromine. These saturated dihalides may be obtained for example, by the reaction of a saturated tertiary halide (i. e. a tertiary alkyl or cycloalkyl halide such as t-butyl chloride or 1-methyl-1-chlorocyclohexane) with a vinyl halide. The alkylating agents are characterized by having both of the halogen atoms on a primary carbon atom and are further characterized by containing a quaternary carbon atom. The compounds which may be used in the present invention include dihaloalkanes such as 1,1-dichloro-2,2-dimethylpropane, 1,1-dichloro-3,3-dimethylbutane, 1,1-dichloro-3-methyl-3-ethylbutane, 1,1-dichloro-3,3-diethylbutane, 1,1-dichloro-3,3-dimethylpentane, 1,1-dibromo-3,3-dimethylbutane, 1,1-dibromo-3,3-dimethylpentane, 1,1-dichloro-3,3-diethylpentane, 1,1-dichloro-4,4-dimethylpentane, 1,1-dichloro-4-methyl-4-ethylpentane, 1,1-dichloro-3,3-dimethylhexane, 1,1-dichloro-4,4-dimethylhexane, 1,1-dibromo-5,5-dimethylhexane, 1,1-dichloro-2-(1-methylcyclohexyl)ethane, and the like.

Aromatic compounds which may be alkylated using the present process are those which contain a replaceable hydrogen atom and include benzene, toluene, and p-xylene, 1,2,3-trimethylbenzene, 1,2,4-trimethylbenzene, etc., ethylbenzene, propylbenzenes, butylbenzenes, etc., 1,2-diethylbenzene, 1,2,3-triethylbenzene, 1,2,4-triethylbenzene, 1,2-dipropylbenzene, 1,3-dipropylbenzene, 1,4-dipropylbenzene, 1,2,3-tripropylbenzene, 1,2,4-tripropylbenzene, etc., naphthalene, α-methylnaphthalene, β-methylnaphthalene, α-ethylnaphthalene, β-ethylnaphthalene, α-propylnaphthalene, β-propylnaphthalene, etc., α,β-dimethylnaphthalene, α,β-diethylnaphthalene, α,β-dipropylnaphthalene, etc. 1,2,3-trimethylnaphthalene, 1,2,4-trimethylnaphthalene, 1,2,3-triethylnaphthalene, etc., anthracene, α-methylanthracene, β-methylanthracene, α-ethylanthracene, β-ethylanthracene, α,β-dimethylanthracene, α,β-diethylnaphthalene, etc., α,β-dipropylanthracene, etc., phenanthrene, 1-methylphenanthrene, 2-methylphenanthrene, etc., 1-ethylphenanthrene, 2-ethylphenanthrene, etc., 1-propylphenanthrene, etc., 1,2-dimethylphenanthrene, 1,3-dimethylphenanthrene, 1,2-diethylphenanthrene, etc., chrysene, 1-methylchrysene, 2-methylchrysene, etc., 1,2-dimethylchrysene, 1,3-diethylchrysene, etc., pyrene, 1-methylpyrene, 2-methylpyrene, etc., 1-ethylpyrene, 2-ethylpyrene, etc., 1,2-dimethylpyrene, etc. It is understood that the above mentioned compounds are set forth only as examples of the aromatic compounds which may be used in this process and that any aromatic compound which will undergo alkylation in a condensation reaction with an alkylating agent may be used in the present process. This will include aromatic compounds such as the phenols, anilines, halogen substituted benzenes such as chlorobenzene, bromobenzene, dichlorobenzene, dibromobenzene, etc., and the like.

The reaction conditions under which the process of the present invention proceeds will depend largely upon the reactants and the catalysts used. The reaction is usually catalyzed by the use of a Friedel-Crafts type catalyst, including aluminum chloride, aluminum bromide, zirconium chloride, boron fluoride, and the like. The preferred catalysts, as used in this process, comprise aluminum chloride and zirconium chloride. Generally, temperatures ranging from about −20° C. to about 150° C. or more will be used in this reaction. When aluminum chloride is used, temperatures within the range of from about −20° C. to about +50° C. will be used.

The reaction is preferably carried out in the presence of a diluent or solvent. This may consist of an excess of the aromatic hydrocarbon. Alternatively, it may consist of a saturated hydrocarbon namely a paraffin or a cycloparaffin. Saturated hydrocarbons containing tertiary carbon atoms are preferred because they increase the yield of monoarylalkanes by more readily serving as a source of hydrogen:

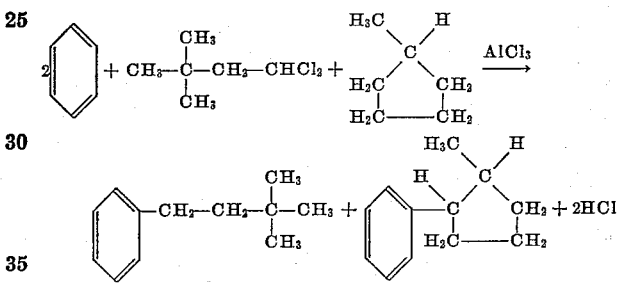

Suitable saturated hydrocarbons include the butanes, pentanes, hexanes, etc., and cyclopentane, cyclohexane, methylcyclopentane, methylcyclohexane, dimethylcyclohexanes, etc.

The process of this invention may be effected in any suitable manner and may be either a batch or continuous type of operation. When a batch type operation is used, a quantity of the starting materials, namely, the alkylating agent and the aromatic hydrocarbon are gradually added to a mixture of the aromatic hydrocarbon and the catalysts in a suitable reaction vessel providing with stirring means. The vessel is heated or cooled to the desired temperature depending upon the reactants and the catalysts used in the process. After a predetermined reaction time has elapsed, the desired product is separated from the catalyst layer, and recovered from the unrecovered starting materials by conventional means, for example, by washing, drying and fractional distillation.

Another method of operation of the present process is of the continuous type. A particularly suitable type of operation comprises the fixed bed type in which the condensation catalyst is disposed as a bed in the reaction zone while the aromatic compound and the alkylating agent passed therethrough in either an upward or downward flow. The alkylation of the aromatic hydrocarbon will continue until the desired time has elapsed, after which the reaction product will be withdrawn from the reaction zone, the liquid product will be separated from the catalyst and distilled to yield unreacted alkylating agent and the aromatic compound which will be recycled for reuse as a portion of the starting material and alkylaromatic compounds. The reaction zone in which this reaction takes place may be an unpacked vessel or coil, or it may contain an adsorbent packing material such as fire brick, alumina, dehydrated bauxite, and the like.

Other continuous types of processes which may be used in this invention include the fluidized type of operation in which the alkylating agent and the aromatic compound along with the condensation catalyst are maintained in a state of turbulence under hindered settling conditions in the reaction zone while the reaction proceeds, and the compact moving bed type of operation in which the reactants comprising the alkylating agent and the aromatic compound pass either concurrently or countercurrently to the condensation catalyst.

Still another type of continuous process is the slurry type process in which the condensation catalyst is carried into the reaction zone as a slurry in the alkylating agent and the aromatic compound. In each of the aforementioned type of processes, the unreacted alkylating agent and the unreacted aromatic compound may be separated out and recycled for use as a portion of the feed material while the desired product is withdrawn and purified.

The following examples are given to illustrate the process of this invention, which, however, are not intended to limit the generally broad scope of the present invention in strict accordance therewith.

*Example I*

A solution of 85 g. (0.55 mole) of 1,1-dichloro-3,3-dimethylbutane of 90 g. (1.1 mole) of benzene was slowly added during a period of 1.5 hours to stirred mixture of 234 g. (3.0 moles) of benzene and 8 g. of aluminum chloride at a temperature of approximately 3° C. Stirring was continued for an additional hour after which the 346 g. of upper layer was decanted from the 44 g. of the lower catalyst layer, washed with water, dried and distilled. 23 g. (26% yield) of hexylbenzene (boiling at 103° C. at 24 mm.) was obtained along with 25 g. (19% yield) of 3,3-dimethyl-1,1-diphenylbutane (boiling at 124° C. at 1.5 mm.). Infra-red analysis indicated that the hexylbenzene was 1-phenyl-3,3-dimethylbutane (neohexylbenzene); neither 3-phenyl-2,2-dimethyl-butane nor 2-phenyl-2,3-dimethyl-butane was present.

The hexylbenzene yielded a monoacetamido derivative which melted at 157° C. There was no depression of the melting point when it was mixed with an authentic sample of the monoacetamido derivative of neohexylbenzene (melting point 158° C.).

*Example II*

A solution of 85 g. of 1,1-dichloro-3,3-dimethylbutane and 90 g. of benzene was added during a period of one hour to a stirred mixture of 234 g. of benzene, 150 g. of methylcyclopentane and 20 g. of aluminum chloride at a temperature of approximately 3° C. Stirring was continued for two hours after which the 483 g. of upper layer was decanted from 65 g. of lower catalyst layer, washed with water, dried and subjected to fractional distillation. About 54 g. of neohexylbenzene (corresponding to a 60% yield) was obtained. There was also obtained about 42 g. (48% yield based on the dichlorodimethylbutane in accordance with the equation shown above) of a phenylmethylcyclopentane fraction boiling at 224–232° C. and 8 g. (3% yield) of 1,1-diphenyl-3,3-dimethylbutane. The advantage of using a saturated hydrocarbon as a solvent is obvious.

The phenylmethylcyclopentane was analyzed.
Found: C, 90.02; H, 10.21. Calculated for $C_{12}H_{16}$: C, 89.93; H, 10.07.

I claim as my invention:

1. A process for the preparation of a primary alkylaromatic compound which comprises reacting a saturated 1,1-dihalide containing a quaternary carbon atom with an alkylatable aromatic compound in the presence of a Friedel-Crafts catalyst at condensation conditions.

2. A process for the preparation of a primary alkylaromatic compound which comprises reacting a saturated 1,1-dihalide containing a quaternary carbon atom with an alkylatable aromatic hydrocarbon containing a replaceable hydrogen atom in the presence of a Friedel-Crafts catalyst at condensation conditions.

3. A process for the preparation of a primary alkylaromatic compound which comprises reacting a 1,1-dihaloalkane containing a quaternary carbon atom with an alkylatable aromatic hydrocarbon containing a replaceable hydrogen atom in the presence of aluminum chloride at condensation conditions.

4. A process for the preparation of a primary alkylaromatic compound containing a quaternary carbon atom which comprises reacting 1,1-dichloroalkane containing a quaternary atom with an alkylatable aromatic hydrocarbon containing a replaceable hydrogen atom in the presence of a Friedel-Crafts catalyst at condensation conditions.

5. A process for the preparation of a primary alkylaromatic compound containing a quaternary carbon atom which comprises reacting 1,1-dibromoalkane containing a quaternary atom with an alkylatable aromatic hydrocarbon containing a replaceable hydrogen atom in the presence of a Friedel-Crafts catalyst at condensation conditions.

6. A process for the preparation of a primary alkylaromatic compound containing a quaternary carbon atom which comprises reacting 1,1-dichloroalkane containing a quaternary atom with an alkylatable aromatic hydrocarbon containing a replaceable hydrogen atom in the presence of aluminum chloride at condensation conditions.

7. A process for the preparation of a primary alkylaromatic compound containing a quaternary carbon atom which comprises reacting 1,1-dibromoalkane containing a quaternary atom with an alkylatable aromatic hydrocarbon containing a replaceable hydrogen atom in the presence of aluminum bromide at condensation conditions.

8. A process for the preparation of a primary alkylaromatic compound containing a quaternary carbon atom which comprises reacting 1,1-dichloro-3,3-dimethylbutane with an alkylatable aromatic hydrocarbon containing a replaceable hydrogen atom in the presence of aluminum chloride at condensation conditions.

9. A process for the preparation of a primary alkylaromatic compound containing a quaternary carbon atom which comprises reacting 1,1-dichloro-2,2-dimethylpropane with an alkylatable aromatic hydrocarbon containing a replaceable hydrogen atom in the presence of aluminum chloride at condensation conditions.

10. A process for the preparation of a primary alkylaromatic compound containing a quaternary carbon atom which comprises reacting 1,1-dichloro-3,3-dimethylbutane with benzene, in the presence of a Friedel-Crafts type catalyst at condensation conditions, and recovering the resultant neohexylbenzene.

11. A process for the preparation of a primary alkylaromatic compound containing a quaternary carbon atom which comprises reacting 1,1-dichloro-3,3-dimethylbutane with benzene, in the presence of aluminum chloride at condensation conditions and recovering the resultant neohexylbenzene.

12. A process for the preparation of a primary alkylaromatic hydrocarbon containing a quaternary carbon atom which comprises reacting 1,1-dichloro-3,3-dimethylbutane with benzene in the presence of zirconium chloride at condensation conditions and recovering the resultant neohexylbenzene.

13. A process for the preparation of a primary alkylaromatic compound containing a quaternary carbon atom which comprises reacting 1,1-dichloro-3,3-dimethylbutane with benzene in the presence of aluminum chloride at a temperature in the range of from about —20° C. to about +50° C. and recovering the resultant neohexylbenzene.

14. A process for the preparation of a primary alkylaromatic hydrocarbon containing a quaternary carbon atom which comprises reacting 1,1-dichloro-3,3-dimethylbutane with benzene in the presence of aluminum chloride at a temperature in the range of from about 0° to about +10° C. and recovering the resultant neohexylbenzene.

References Cited in the file of this patent

UNITED STATES PATENTS

| | | |
|---|---|---|
| 2,393,526 | Flett | Jan. 22, 1946 |
| 2,617,837 | Coleman et al. | Nov. 11, 1952 |
| 2,648,713 | Schneider | Aug. 11, 1953 |
| 2,673,224 | Kennedy et al. | Mar. 23, 1954 |